United States Patent
Pannell et al.

(10) Patent No.: US 6,208,644 B1
(45) Date of Patent: Mar. 27, 2001

(54) NETWORK SWITCH PROVIDING DYNAMIC LOAD BALANCING

(75) Inventors: Donald Robert Pannell, Cupertino; Robert Donald Hemming, Ben Lomond, both of CA (US)

(73) Assignee: I-Cube, Inc., Campbell, CA (US)

( * ) Notice: Subject to any disclaimer, the term of this patent is extended or adjusted under 35 U.S.C. 154(b) by 0 days.

(21) Appl. No.: 09/041,823

(22) Filed: Mar. 12, 1998

(51) Int. Cl.[7] .................................................. H04L 12/56
(52) U.S. Cl. ........................ 370/389; 370/392; 370/400; 370/422
(58) Field of Search .................................. 370/389, 392, 370/397–399, 380, 400, 414, 422, 426

(56) References Cited

U.S. PATENT DOCUMENTS

| | | | |
|---|---|---|---|
| 5,412,648 | * | 5/1995 | Fan ........................................ 370/414 |
| 5,689,644 | * | 11/1997 | Chou et al. ........................... 370/392 |
| 5,754,791 | * | 5/1998 | Dahlgren et al. ..................... 370/400 |

* cited by examiner

*Primary Examiner*—Chi H. Pham
*Assistant Examiner*—Maikhanh Tran

(74) *Attorney, Agent, or Firm*—Daniel J. Bedell; Smith-Hill and Bedell

(57) ABSTRACT

A network switch routes data transmissions between network stations, each data transmission including network addresses of the source and destination network stations. The network switch includes a set of input/output (I/O) ports each for receiving data transmissions from and transmitting data transmissions to a subset of the network stations. Each I/O port is identified by a "physical" port ID and a "logical" port ID. While each I/O port's physical port ID is unique, all I/O ports that can route data to the same subset of network stations share the same logical port ID. Each I/O port receiving a data transmission from a network station sends its logical port ID and the network addresses included in the data transmission to an address translation system. The address translation system uses data in the translation request to maintain a lookup table relating each subset of network addresses to a logical port ID identifying all I/O ports that communicate with network stations identified by that subset of network address. The address translation system responds to an address translation request by returning the logical port ID of all I/O ports that can send data transmissions to a destination station identified by the destination address included in the data transmission. In response to the returned logical port ID, the network switch establishes a data path for the data transmission from the I/O port receiving the data transmission and any idle I/O port having that logical port ID.

10 Claims, 11 Drawing Sheets

NETWORK SWITCH PROVIDING DYNAMIC LOAD BALANCING

BACKGROUND OF THE INVENTION

1. Field of the Invention

Figure 1:
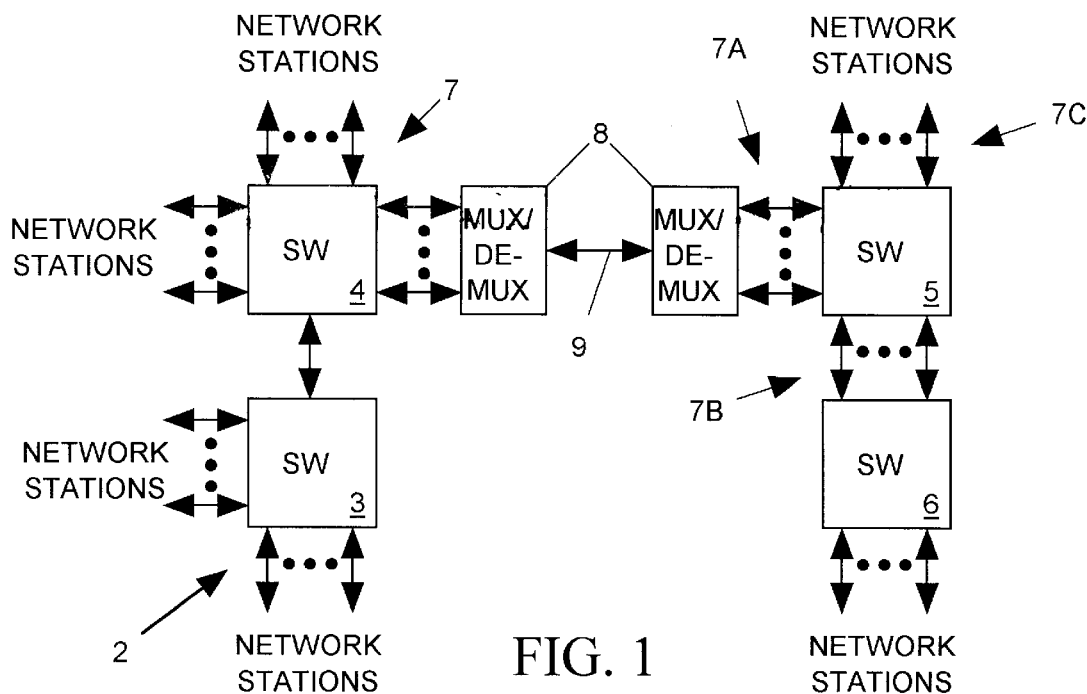

The present invention relates in general to a network switch for routing network data transmissions between network stations, and in particular to a switch including a system for dynamically balancing loads over multiple output ports servicing the same set of network stations.

2. Description of Related Art

Networks transfer data between computers or other types of network stations. For example 10BASE-T Ethernet systems use sets of twisted pair conductors to connect network stations to a central hub or switch. A network switch includes input ports for receiving data packets from various network sources, output ports for forwarding packets to various network destinations and a switching mechanism such as a crosspoint switch for selectively routing each incoming packet from an input port to the appropriate output port. The network switch also includes an address translation system which relates a network destination address included in each incoming packet to an output port that can forward the packet to that network address. When an input port receives an incoming packet it stores the packet, reads its network destination address, consults the address translation system to determine which output port is to forward the packet, and then sends a routing request to the switch's arbitration system. When the arbitration system determines that the requested output port is idle it establishes a connection through the crosspoint switch between the requesting input port and the requested output port and then notifies the input port that it may begin sending the packet to the output port via the crosspoint switch.

A typical large network is often organized into clusters of stations with network stations of each cluster being linked to ports of a common network switch. Other ports of network switches serving the various clusters are then linked to one another. In such a network, a packet originating at a network station connected to one network switch may travel through that switch and possibly several others before reaching its destination station.

When there is a relatively large volume of traffic between two network switches, it is helpful to link several ports of the two switches to provide more than one path between them. Multiple links can be provided by separate transmission lines, each connecting an output port of one switch to an input port of another. Such links could also be provided by a high speed multiplexer/demultiplexer system connected to several input/output ports of each switch. A multiplexer at one end of a transmission line receives data packet transmissions concurrently from several output ports of one switch and multiplexes them onto the high speed transmission line. A demultiplexer at the opposite end of the transmission line separates the packets and routes them concurrently into separate input ports of another switch. The two switches, however, simply view the multiplexer/demultiplexer system as several separate paths.

In order to make efficient use of multiple paths between network switches we would like to distribute the transmission load evenly over those multiple paths. But load balancing has been problematic. Recall that a switch input port receiving a packet consults an address translation system to find out which switch output port is to receive the packet. Although the address translation system may assign many different network destination addresses to the same switch output port, it can assign each network address to one and only one output port. Thus, for example, when 10 output ports of a first switch are connected to 10 input ports of a second switch by 10 transmission lines, the first switch can forward an incoming data packet addressed to a network station connected to the second switch via only one of the 10 output ports. If that particular output port is busy, packet transmission is blocked and the input port has to store the packet until the particular output port is available, even if the other nine output ports linked to the second switch are idle.

In order to better distribute the loads on the 10 output ports, some prior art address translation system assigns an equal number of network addresses to each of the 10 output ports. But if the traffic to some network addresses is much higher than the traffic to others, the load will riot be balanced and system throughput will not be optimal. A network manager could manually adjust the manner in which the address translation system allocates network addresses to output ports to account for differences in traffic levels. However such manual load balancing is labor intensive and often ineffective when good traffic data is not available or when there are frequent changes in the amount of traffic to particular network addresses.

What is needed is a load balancing system for a network switch that is automatic, simple, inexpensive and effective.

SUMMARY OF THE INVENTION

A network switch in accordance with the present invention routes data transmission "packets" between network stations, each data packet including a network address of a source station sending the data transmission and the network address of a destination station to receive the data packet. The network switch includes a set of input/output ports for receiving the data packet from source stations and for selectively forwarding the data packets to destination stations. A crosspoint switch selectively routes data packets between the I/O ports.

In accordance with one aspect of the invention, each I/O port of the network switch is assigned both a "physical" port ID and a "logical" port ID. While each I/O port's physical port ID is unique, all I/O ports that communicate with the same set of network stations share the same logical port ID. When an I/O port receives an incoming packet it stores the packet and sends the network destination address to an address translation system. The address translation system then ascertains the logical port ID assigned to the set of I/O ports that can communicate with the destination station at that destination address. A switch arbitration system then looks for an idle I/O port having that logical port address that is not currently busy forwarding a data packet. On finding an idle I/O port, the switch arbitration system sends a switch controller the physical port ID of the port that received the packet from the source station and the physical port ID of the idle port that is to forward the packet to the destination station. The switch controller then establishes a data path through the crosspoint switch between the two I/O ports. Once the data path is established, the I/O port that received the packet sends the packet through the crosspoint switch to the I/O port that forwards the packet to the destination station.

Since the address translation system relates each network address to a logical output port ID rather than to a physical output port ID, a busy output port will not block packet transmission when there is an idle output port having the same logical ID, and traffic loads are dynamically balanced for optimum throughput.

It is accordingly an object of the present invention to provide a switch which automatically balances traffic though output ports connected to the same network destination.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

Figure 2:
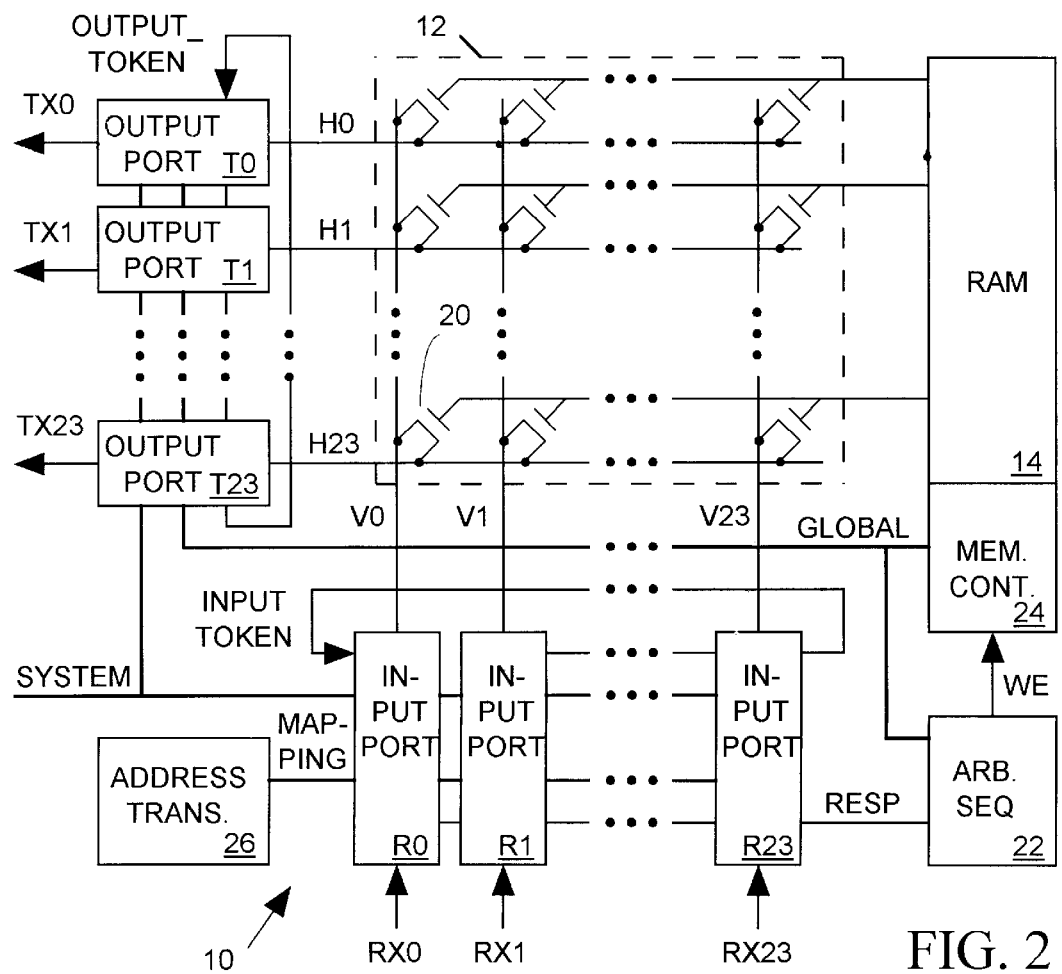
Figure 3:
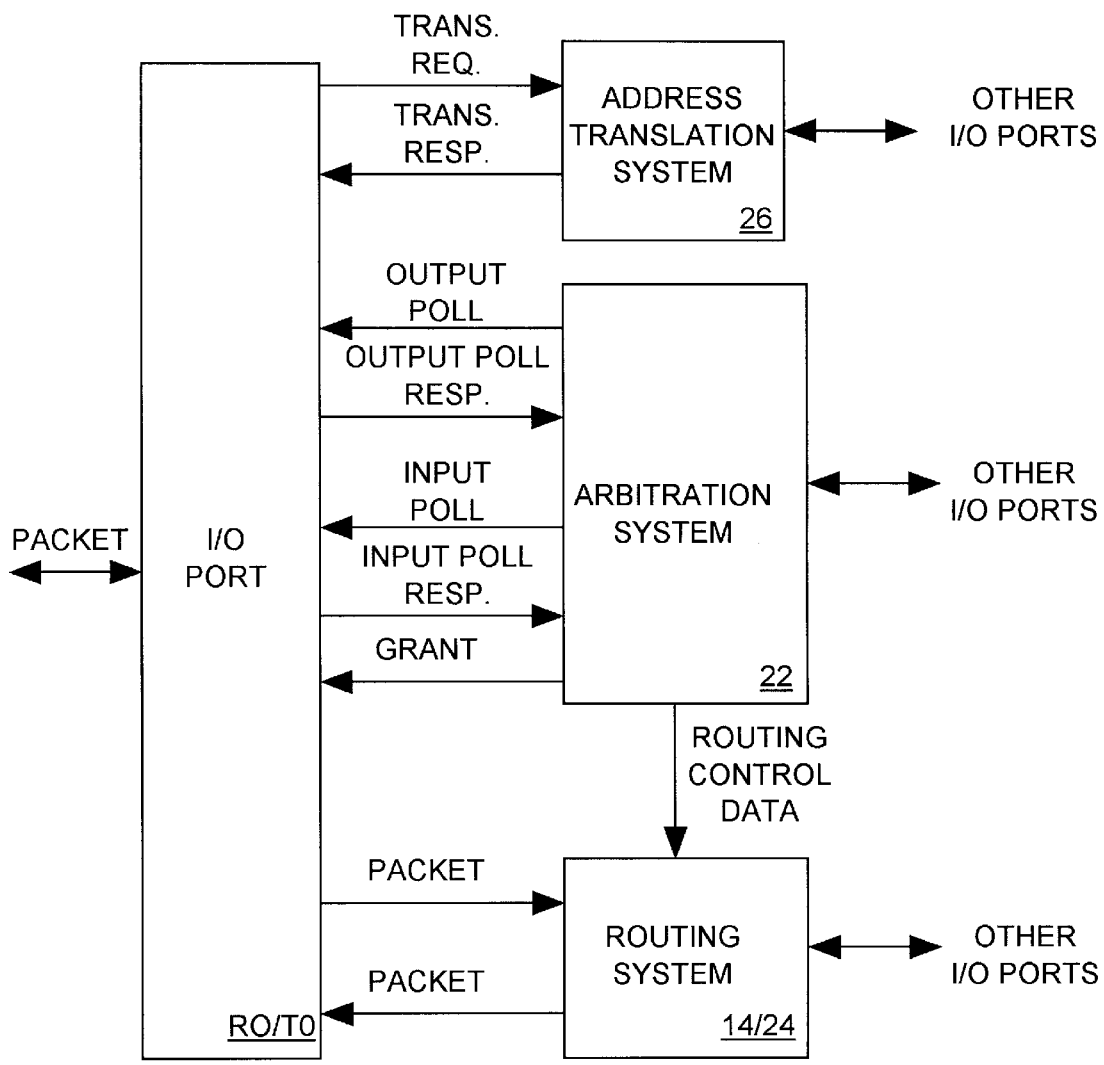
Figure 4:
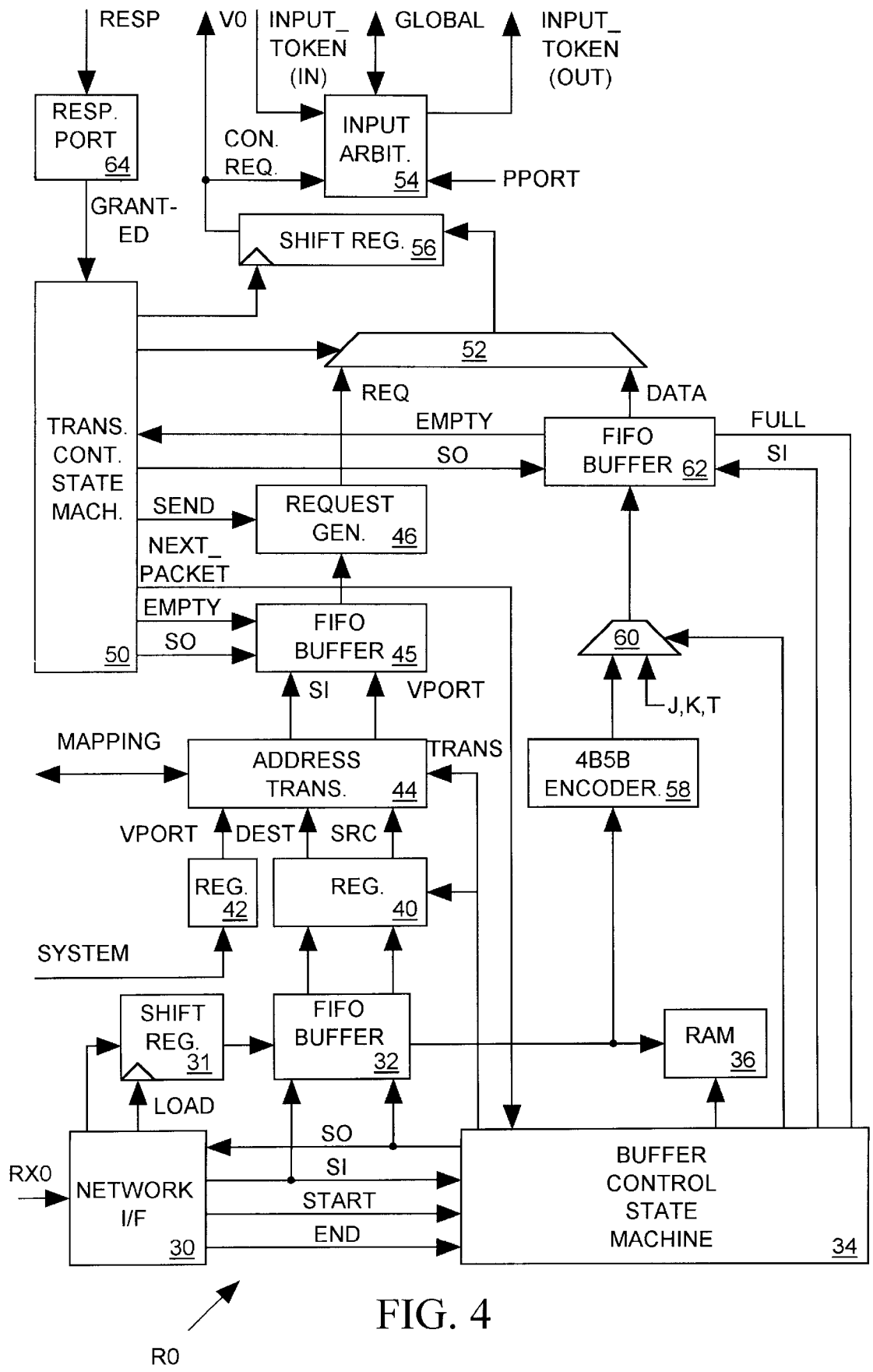
Figure 5:
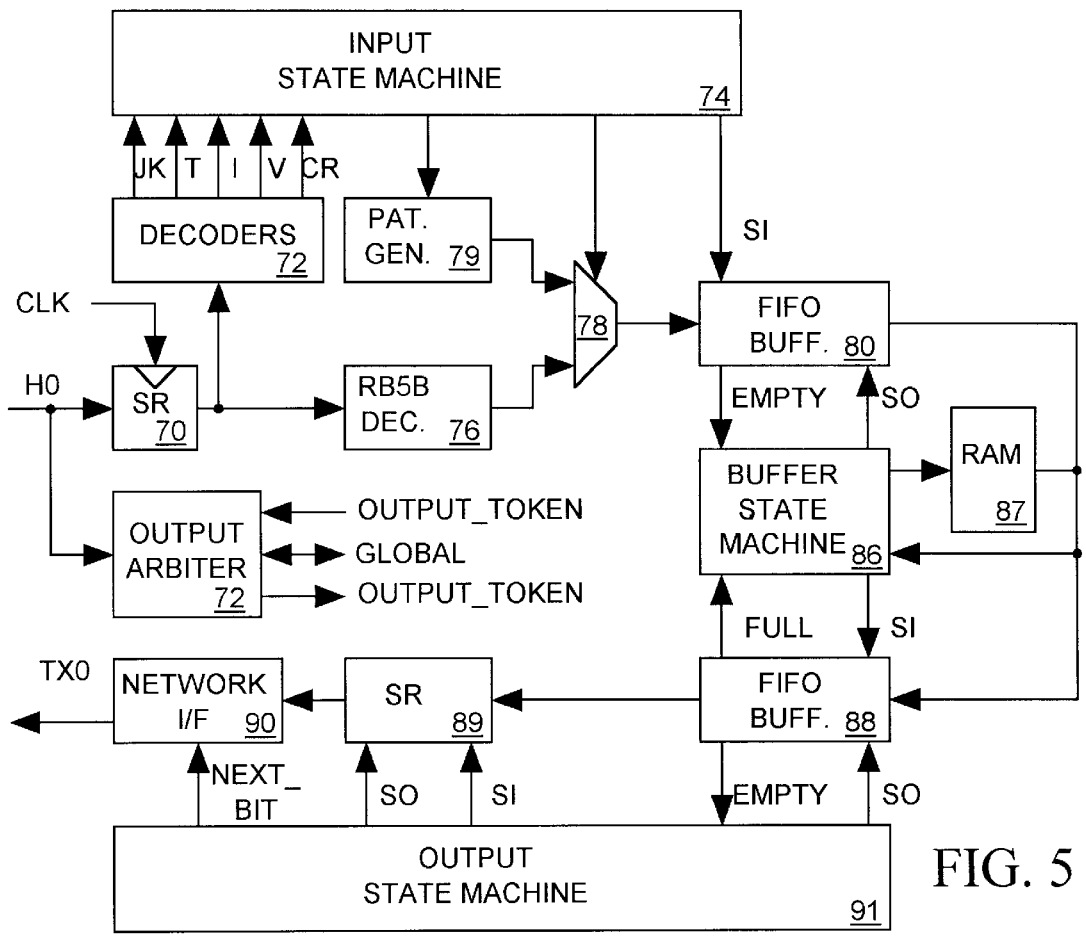
Figure 6:
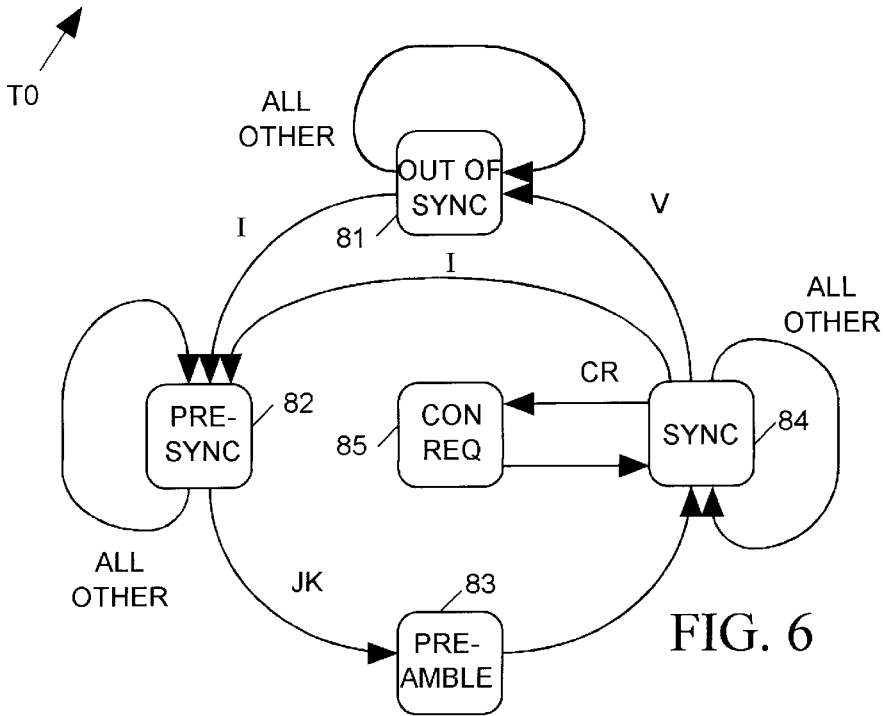
Figure 7:
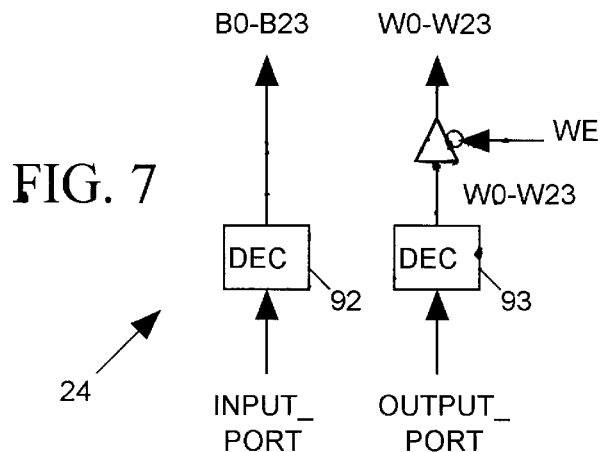
Figure 8:
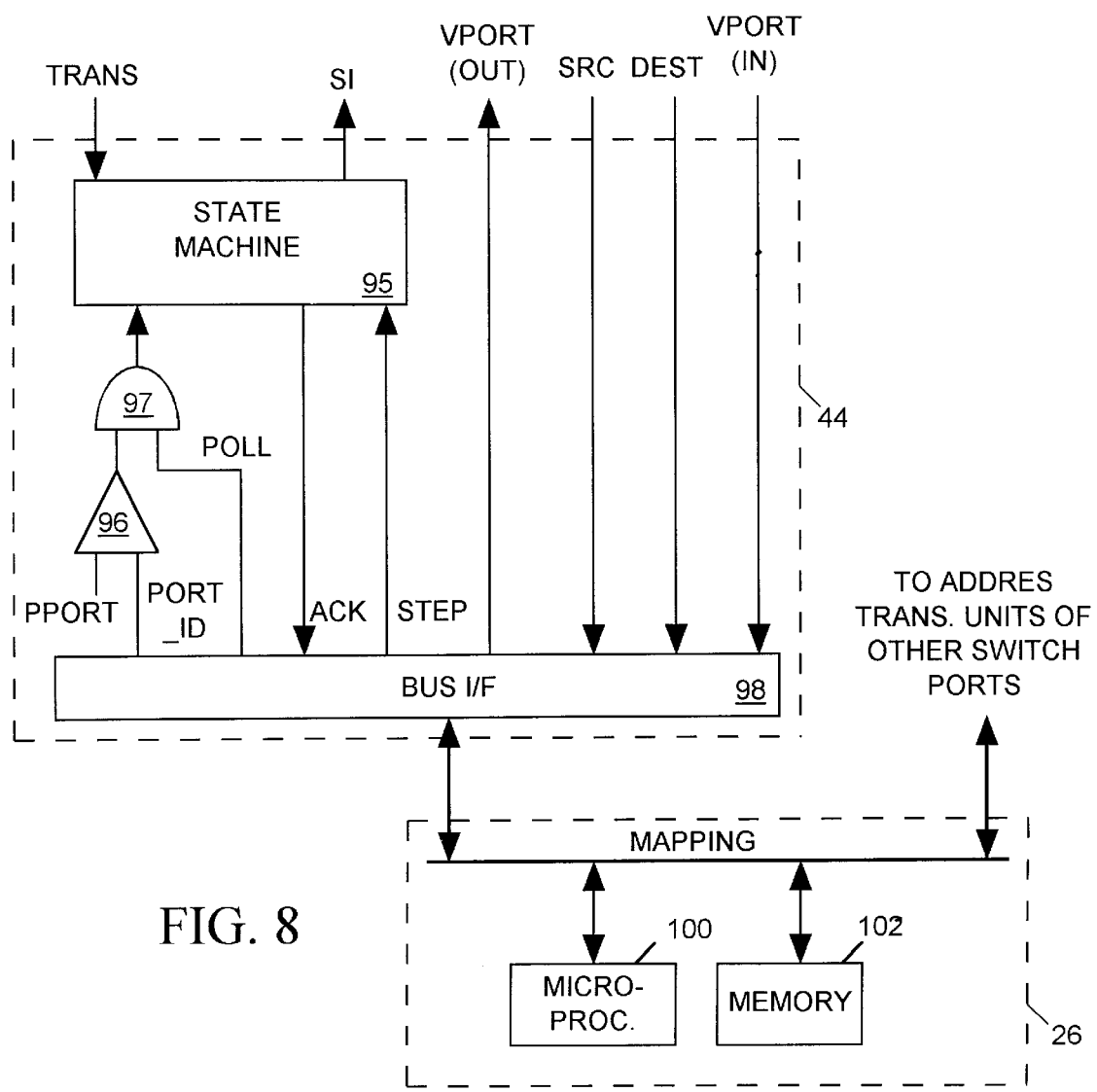
Figure 9:
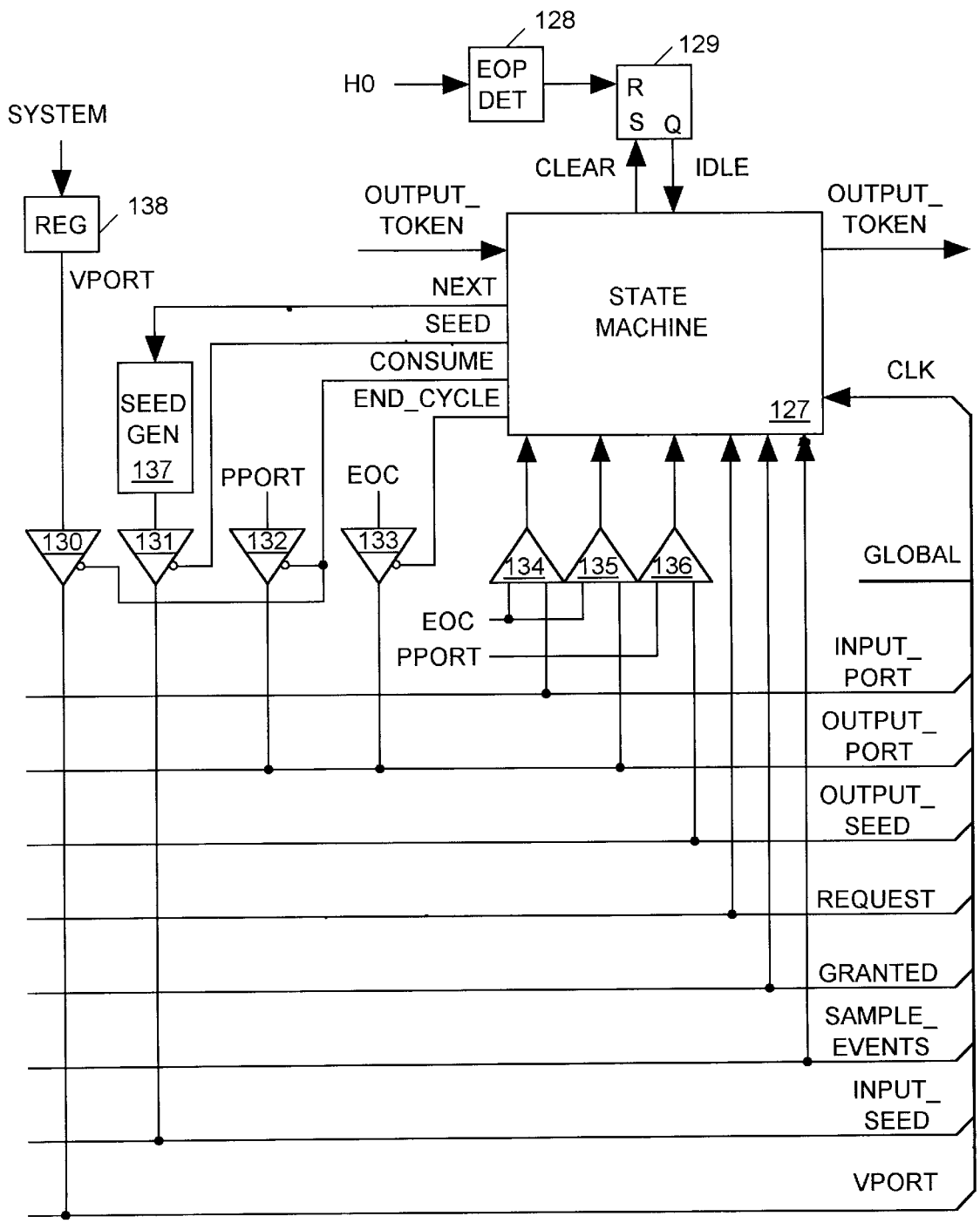
Figure 10:
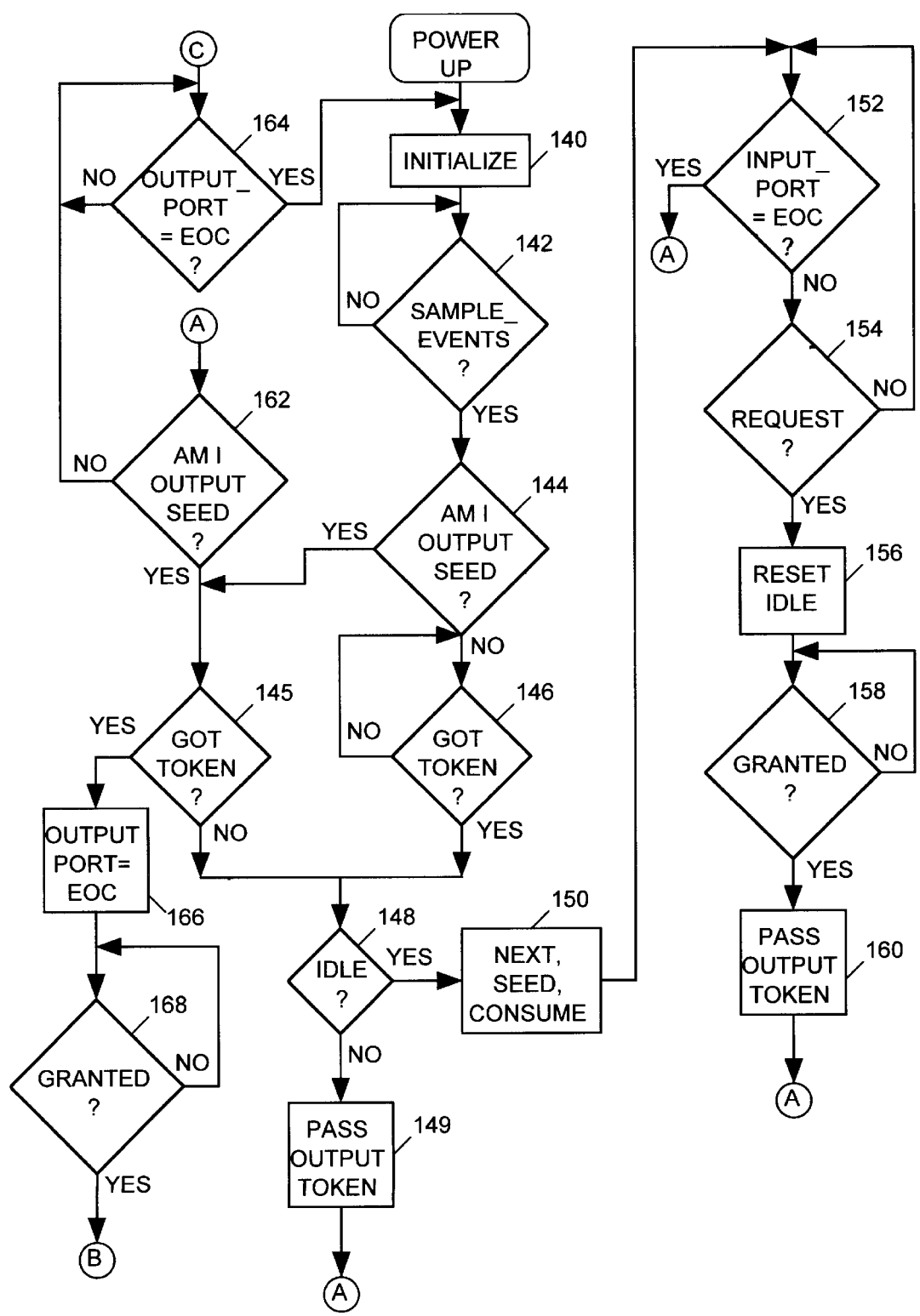
Figure 11:
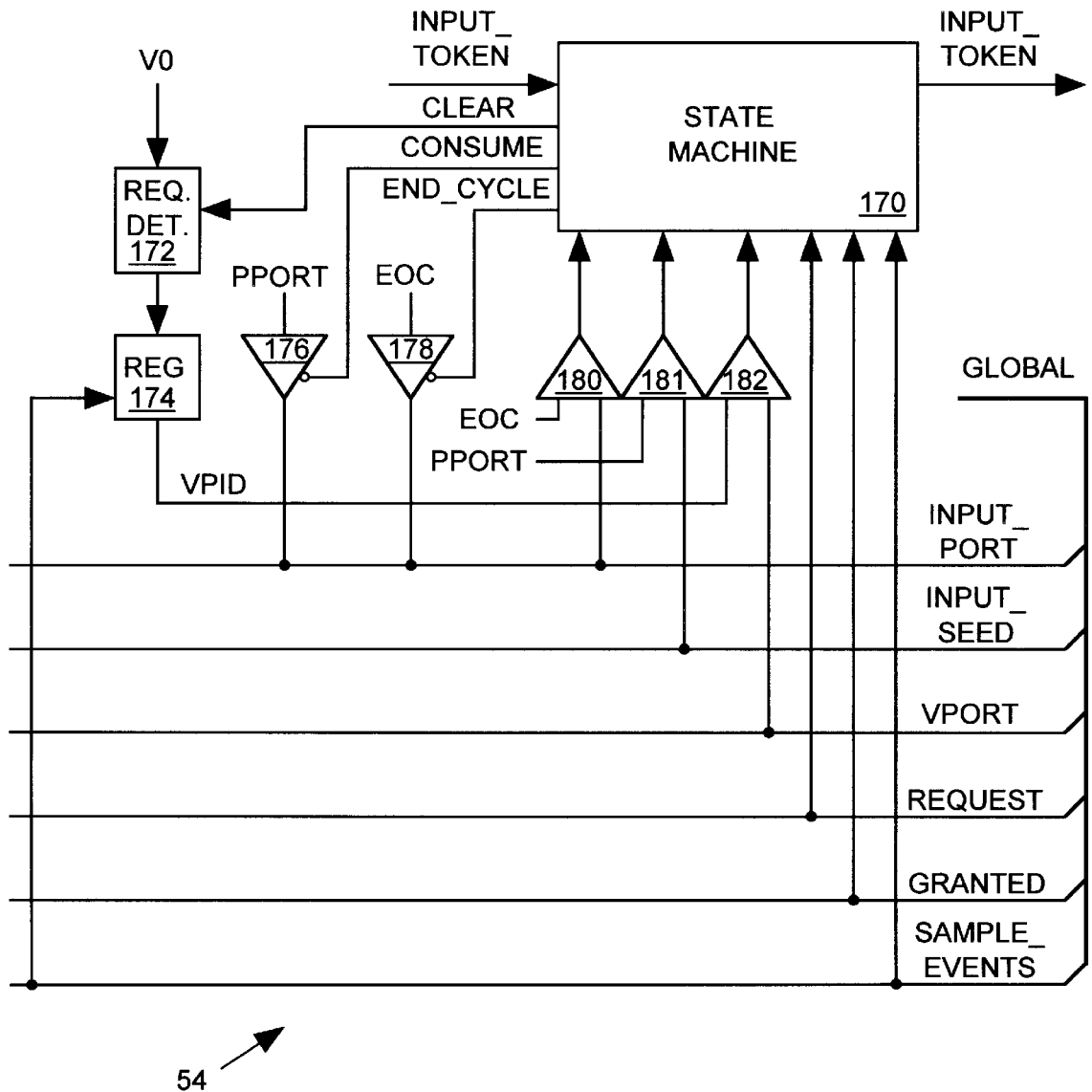
Figure 12:
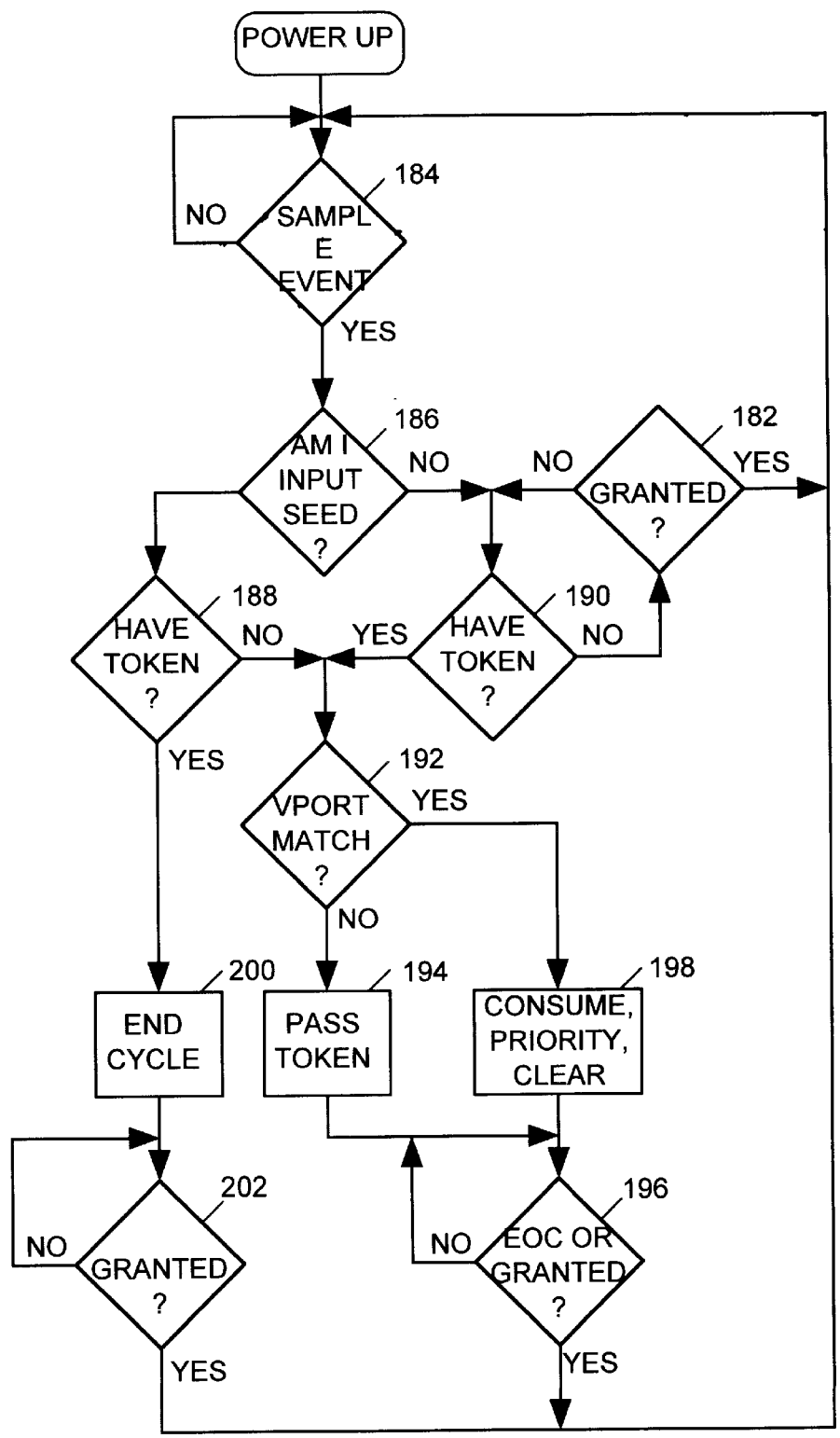
Figure 13:
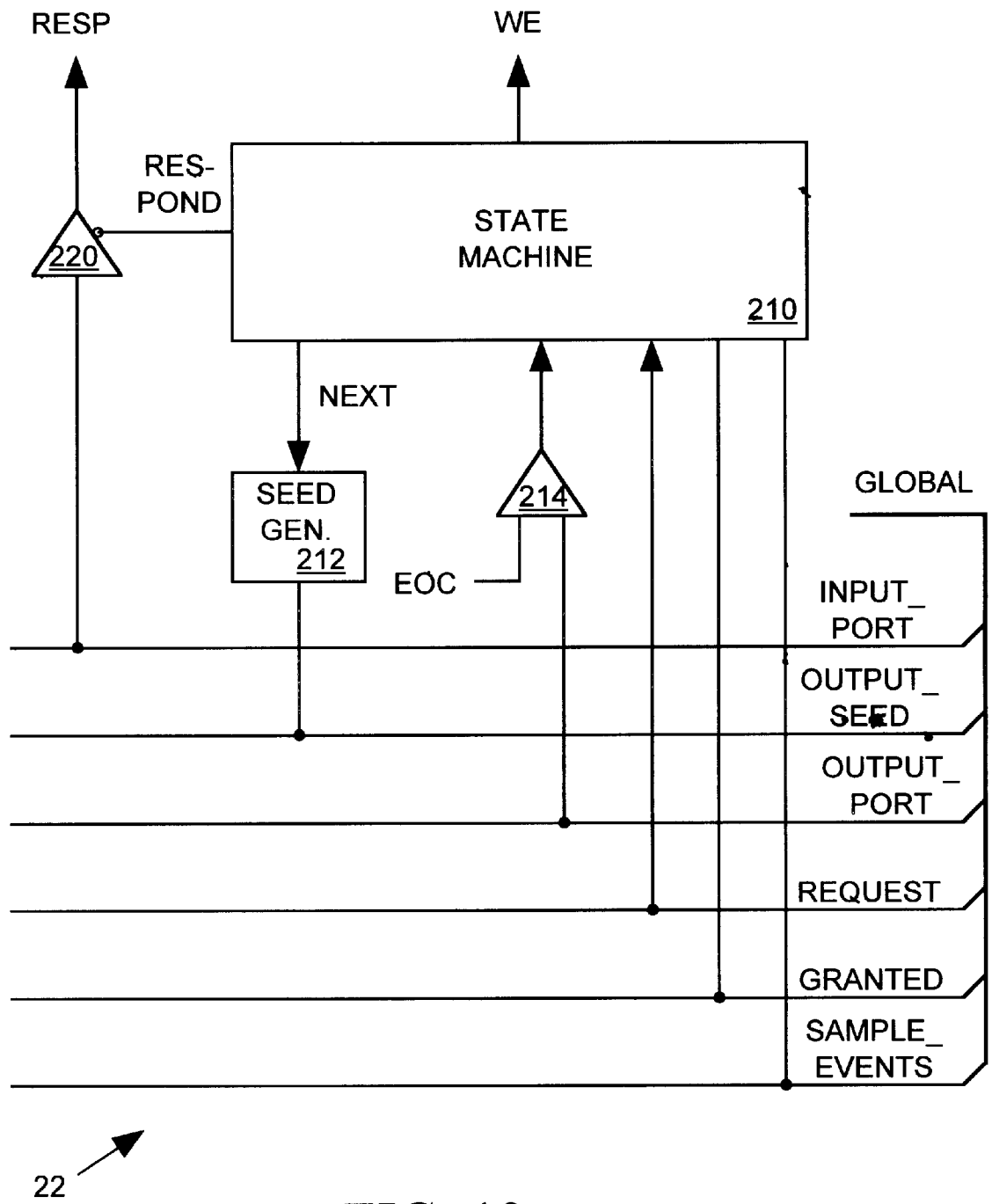
Figure 14:
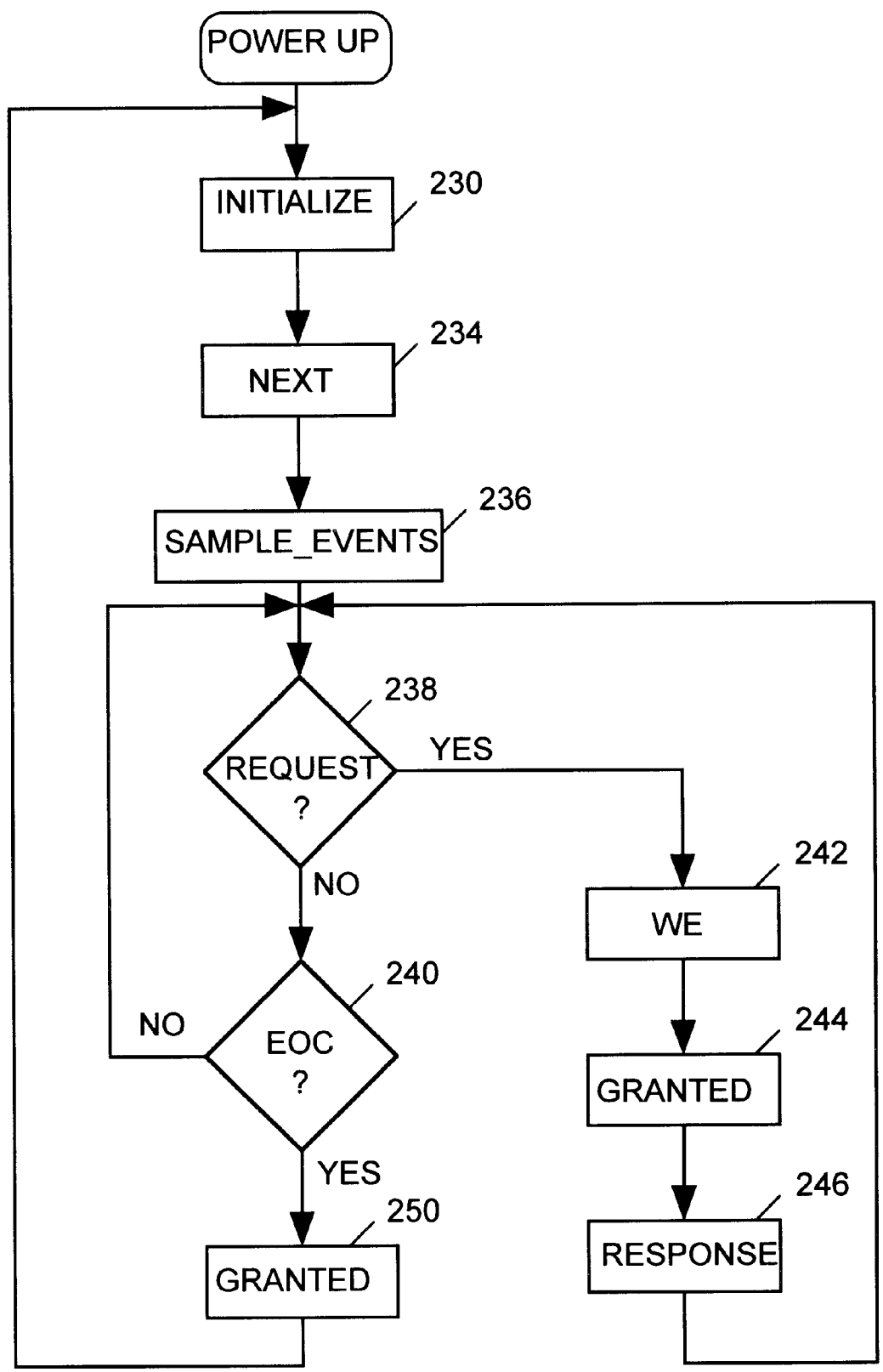

FIG. 1 illustrates a computer network employing a set of network switches in accordance with the present invention for routing data packets between various network stations, FIG. 2 illustrates in block diagram form a network switch suitable for implementing any one of the network switches of FIG. 1, FIG. 3 illustrates data flow within the network switch of FIG. 2, FIG. 4 illustrates a typical input port of FIG. 2 in more detailed block diagram form, FIG. 5 illustrates a typical output port of FIG. 2 in more detailed block diagram form, FIG. 6 is state diagram illustrating a synchronization process carried out by input sequencer of FIG. 5, FIG. 7 illustrates the memory controller 24 of FIG. 2 in more detailed block diagram form, FIG. 8 illustrates the address translation system of FIG. 2 and the address translation unit of FIG. 4 in more detailed block diagram form, FIG. 9 illustrates the output arbiter portion of the output port of FIG. 5 in more detailed block and schematic diagram form, FIG. 10 is a flow chart illustrating operation of the state machine of FIG. 9, FIG. 11 illustrates the input arbiter of the input port of FIG. 4 in more detailed block diagram form, FIG. 12 is a flow chart illustrating operation of the state machine of FIG. 11, FIG. 13 illustrates the arbitration sequencer of FIG. 2 in more detailed block diagram form, and FIG. 14 is a flow chart illustrating operation of the state machine of FIG. 13.

DESCRIPTION OF THE PREFERRED EMBODIMENT(S)

Network Topology

FIG. 1 illustrates a computer network 2 employing a set of network switches 3–6 to route data packets between various network stations. Each network switch 3–6 includes a set of input/output ports 7, each input/output port linking the network switch to one or more network stations or to an input/output port 7 of another network switch. When a network station wants to send data to another network station, it forwards the data to an input port of one of network switches 3–6. If the destination station is connected to an output port of the receiving network switch, the receiving switch forwards the packet directly to the destination station. On the other hand, when the destination station is connected to another switch, the switch receiving the packet forwards the packet to that other network switch possibly via an intervening network switch.

Network 2 can be easily expanded by connecting additional switches to the system. There are various alternative arrangements for interconnecting network switches. For example when traffic between two switches is low, a single input/output port pair of one switch (e.g. switch 3) may be connected an input/output port the other (e.g. switch 4). When traffic between two switches is high, each of several input/output ports of one switch may be directly connected to an input/output of another switch, as illustrated by the connections between switches 5 and 6 of FIG. 1.

To reduce the number of transmission lines between ports having high traffic multiple links between two switches, such as switches 4 and 5, conventional multiplexer/demultiplexer (M/D) units 8 may link several input/output ports of each switch. A multiplexer portion of M/D unit 8 at one end a transmission line 9 receives data packet transmissions concurrently from several output ports of switch 4 and multiplexes them onto the high speed transmission line 9. A demultiplexer portion of M/D unit 8 at the opposite end of the transmission line separates the packets and routes them concurrently into separate input ports of switch 5. The two switches 4 and 5, however, view the multiplexer/ demultiplexer system 8 as several separate paths. Multiple paths may also be provided between a network switch and a busy network station having several input/output ports.

Network Switch Architecture

FIG. 2 illustrates a network switch 10 suitable for implementing any one of switches 3–6. of FIG. 1. Network switch 10 includes a set of 24 input/output (I/O) ports R0/T0–T0/T23. Each input port portion R0–R23 of an I/O port receives incoming packets arriving on a corresponding one of input buses RX0–RX23 while each output port portion T0–T23 of an I/O port transmits packets outward on a corresponding one of output buses TX0–TX23. A crosspoint switch 12 routes packets from input ports R0–R23 to appropriate output ports T0–T23. Switch 12 includes a set of 24 "vertical" conductors V0–V23, each connected to a corresponding one of input ports R0–R23 and a set of 24 "horizontal" conductors H0–H23, each connected to a corresponding one of output ports T0–T23. Switch 12 also includes a set of pass transistor 20 controlled by data stored in a random access memory 14. Each pass transistor 20 can selectively interconnect one of horizontal lines H0–H23 to one of vertical lines V0–V23. Transistors 20 are arranged so that, depending on the data stored in RAM 14, data can be routed through switch 12 from any input port R0–R23 to any output port T0–T23 with any number of data paths through switch 12 being concurrently active. As discussed below, to alter connections provided by switch 12, a memory controller 24 writes data to RAM 24 in response to a write enable signal WE from an arbitration sequencer 22 and connection request data conveyed on a bus (GLOBAL) linking the input and output ports to sequencer 22 and to memory controller 24. As discussed below, an address translation system 26 linked to the input ports R0–R23 via a bus (MAPPING) maintains a data base that enables switch 10 to determine how to route each incoming data packet through the switch.

Port IDs and Network Addressing

Each input/output port pair R0/T0–R23/T23 of switch 10 is permanently assigned a unique "physical" port ID indicating the particular vertical/horizontal line pair V0/H0 connected to the port pair. In accordance with the invention, each input/output port R0/T0–R23/T23 is also assigned a "logical" port ID references a particular set of network stations that can be accessed through that input/output port. A port's logical ID may not be unique. For example refereeing to FIG. 1, all input/output ports 7A of switch 5 connected to M/D unit 8 share the same logical port ID because each of those ports 7A provide devices communicating through switch 5 with access to the same set of network stations—namely all stations connected either to switch 3 or to switch 4. The ports 7B of switch 5 connected to switch 6 share another logical port ID because each port 7B gives devices communicating through switch 5 access to another set of network stations—the network stations connected to switch 6. Finally, each input/output port 7C connecting switch 5 to an individual network station has a unique logical ID because it does not provide switch 5 with access to the same set of network stations as any other switch 5 input/output port. The logical ID of each switch port is assigned by an external host controller (not shown) by supplying control data to each input/output port R0/T0–R23/T23 through a system bus (SYSTEM).

Each network station is assigned a unique network address that is independent of its connection to any network switch. When a network station transmits a data packet via the network, the data packet includes the unique network addresses of both the source station sending the packet and the destination station to receive the packet. When a network switch receives the packet it must route that packet to an appropriate output port so that the packet eventually reaches the destination station. The input ports R0–R23 of switch 10 of FIG. 2 access address translation system 26 through a parallel bus (MAPPING). Address translation system 26 maintains a lookup table which relates a network station's network address to its logical port ID.

Control Data Flow

FIG. 3 illustrates data flow within network switch 10 of FIG. 2 between I/O port R0/T0, arbitration sequencer 22, address translation system 26 and the routing system (RAM 14 and memory controller 24). When I/O port R0/T0 receives an input packet it stores the packet and transmits a translation request to address translation system 26 via the mapping bus of FIG. 2. The request includes the source and destination station network addresses included in the packet along with the logical ID of the I/O port making the request. Address translation system 26 uses the logical port ID and the source address to update its internal address-to-logical port ID lookup table. Address translation system 26 also uses the lookup table to determine a logical port ID of I/O ports that communicate with the network station identified by the destination address included in the translation request. Address translation system 26 returns this logical port ID to I/O port R0/T0 via the mapping bus.

Arbitration sequencer 22 sequentially polls the output ports T0–T23 via the GLOBAL bus of FIG. 2 to determine if they are idle, not currently forwarding a packet. If an output port is idle it responds to the poll by returning its own physical and logical port IDs via the GLOBAL bus. The arbitration system 22 then sequentially polls the input ports R0–R23 by sending them the logical port ID of the idle output port. If a polled input port is currently storing a packet that is destined for that logical port, it responds to the input poll by returning its own physical port ID. Arbitration system 22 then forwards the physical port IDs of the responding input and output ports as routing control data input to routing system 14/24. Routing system 14/24 then establishes a data path between the two I/O ports. Arbitration system 22 then signals the input port via the GLOBAL bus that its request for a connection has been granted. The input port then forwards the packet through routing system 14/24 to the output port, and the output port forwards the packet to the destination station.

Input Port

FIG. 4 illustrates the input port R0 portion of I/O port R0/T0 of FIG. 2 in more detailed block diagram form. Input ports R1–R23 are similar. A network station transmits a data packet to input port R0 in serial form via bus RX0 using Ethernet 10BASE-T protocol. The data packet, formatted as a standard Ethernet protocol data unit, is of variable length and includes the fields illustrated in Table I:

TABLE I

| Field | Field Length | Purpose |
| --- | --- | --- |
| PREAMBLE | 7 bytes | Used for synchronizing |
| START | 1 byte | Start of frame delimiter |
| DEST | 6 bytes | Destination Network address |
| SRC | 6 bytes | Source Network address |
| TYPE/LEN | 2 bytes | Type or Length of data field |

TABLE I-continued

| Field | Field Length | Purpose |
| --- | --- | --- |
| DATA | 46–1500 bytes | Data field |
| CRC | 4 bytes | Frame check field |

The PREAMBLE and START fields are fixed data patterns that are the same for all packets. The DEST field indicates the network address of the station to receive the packet. The SRC field indicates the network address of the station that transmitted the packet. The TYPE/LEN fields may indicate either the packet type or the length of the DATA field, depending on the protocol being employed. The DATA field holds the packet payload data and may be from 46 to 1500 bytes long. The CRC field is a frame check field used by the receiving station to determine whether the packet has been corrupted in transmission.

Referring to FIG. 4, a conventional 10BASE-T network interface circuit 30 receives the incoming packet arriving on input bus RX0. A carrier signal conveyed on the bus indicates the beginning and end of packet transmission. As each bit of a data packet arrives, the network interface circuit 30 pulses a LOAD signal to store the bit in a 4-bit serial-in/parallel out shift register 31. When the first 4-bit "nibble" (half byte) of the data packet following the preamble has been loaded into register 31, interface circuit 30 asserts a shift-in (SI) signal to a first-in/first-out (FIFO) buffer 32, causing the FIFO port to store the nibble. Interface circuit 30 continues to load each successive nibble of the data packet into buffer 32.

When the longest stored nibble in FIFO buffer 32 is the first nibble of a data packet following the preamble, network interface circuit 30 transmits a START signal to a buffer control state machine 34. State machine 34 controls the storage of data packets in a buffer memory, random access memory (RAM) 36. On receipt of the START signal, state machine 34 begins pulsing a shift-out signal (SO), each pulse causing FIFO buffer 32 to shift a 4-bit data nibble out to RAM 36 via a 4-bit data bus 61. RAM 36, controlled by address and read/write control signals generated by state machine 34, stores the packet data nibbles at sequential addresses. Network interface circuit 30 counts the nibbles of each packet it loads into FIFO buffer 32 and also counts pulses of the SO signal produced by state machine 34 to determine how many nibbles state machine 34 has stored in RAM 36. After interface circuit 30 shifts the last nibble of a packet into FIFO buffer 32, it continues to count the number of nibbles the state machine 34 shifts out of buffer 32 and sends an END signal to state machine 34 to tell it that it has acquired the last nibble of the packet. State machine 34 also counts nibbles of incoming packet data as they are stored in RAM 36. After receiving the END signal from network interface 30, state machine 34 stores its count in RAM 36 as a LENGTH field in a header portion of the packet. When the packet is later forwarded to an output port, the output port determines the length of the packet from the LENGTH field.

As it loads packet data into RAM 36, state machine 34 determines from its nibble count when the data packet's source and destination fields (SRC and DEST) appear in FIFO buffer 32. At that point state machine 34 generates a translate signal (TRANS) causing a register 40 to store the SRC and DEST fields. The TRANS signal also signals an address translation circuit 44 that new address data is available in register 40. A register 42 write accessed by the external controller through the SYSTEM bus, stores the logical port ID (VPORT) for port R0 and supplies it to address translation circuit 44. As discussed above, address translation system 26 maintains a table relating each network address to a logical port ID. Address translation system 26 periodically polls address translation circuit 44 to determine if there is pending translation data in registers 40 and 42. If so address translation system 26 obtains the SRC, DEST and VPORT fields from registers 40 and 42 via translation circuit 44 and thereafter returns the logical port ID corresponding to the network destination address in the DEST field. Translation circuit 44 then delivers that logical port ID (VPORT) to a FIFO buffer 45. FIFO buffer 45 asserts an EMPTY signal to a transmit control state machine 50 when is empty and de-asserts it when it stores a port ID.

If FIFO buffer 45 is not empty, a connection request is pending. State machine 50 monitors an EMPTY signal asserted by FIFO buffer 45 when buffer 45 contains no logical port IDs. The longest stored logical port ID in FIFO buffer 45 is supplied to a connection request generator circuit 46. When it sees that the EMPTY signal is de-asserted, indicating a connection request is pending, sequencer 45 pulses a SEND signal causing request generator 46 to produce a connection request REQ in the form of a sequence of 5-bit data values which pass through multiplexer 52 to a shift register 56. The connection request REQ contains the logical port ID longest stored in FIFO buffer 45. Shift register 56 converts the sequence of 5-bit data values to a serial data stream and forwards it on line V0 to an input arbiter 54.

As described in more detail below, input arbiter circuit 54 arbitrates for a connection through switch 12 of FIG. 1 to one of the output ports T0–T23 that is assigned to the logical port ID returned by address translation system 26 of FIG. 2. When arbitration sequencer 22 of FIG. 2 grants the connection request, it transmits a response on a RESP line to a response port 64 of FIG. 4. The response indicates the physical port ID (PPORT) of the input port that requested the connection. When response port 64 detects a response conveying the physical port ID of input port R0, it pulses a GRANTED signal. The GRANTED signal pulse tells state machine 50 that the last connection request made by input port R0 has been granted and that it is free to issue a next connection request.

When state machine 50 receives a GRANTED signal pulse it transmits a NEXT_PACKET signal to state machine 34 indicating it may begin forwarding a next packet. State machine 34 then switches a multiplexer 60 to receive a hardwired 5-bit code "J". Sequencer 34 then shifts the "J" code output of multiplexer 60 into a FIFO buffer 62, switches multiplexer 60 to select a hardwired "K" code and shifts the "K" code output of multiplexer 60 into a FIFO buffer 62. (As explained below, the JK code sequence marks the beginning of a data packet transmission on output line V0.) Thereafter, state machine 34 switches multiplexer 60 to select the 5-bit data output of an encoder circuit 58 which converts the 4-bit data appearing on data input/output bus 61 of RAM 36 to 5-bit "4B5B" encoded form. Sequencer 34 then begins sequentially reading 4-bit nibbles of the data packet out of RAM 36. As encoder 58 converts the nibbles to 5-bit 4B5B encoded form, multiplexer 60 passes the 5-bit result to a FIFO buffer 62. Sequencer 34 strobes a shift in (SI) signal causing FIFO buffer 62 to load the 5-bit data values. FIFO buffer 62 produces a FULL signal telling state machine 34 when the buffer is full. The longest stored nibble in FIFO buffer 62 appears at an input of multiplexer 52 controlled by the transmit state machine 50. When packet data is currently stored in FIFO buffer 62, buffer 62 de-asserts an EMPTY signal supplied to state machine 50. When state machine 50 is not currently sending a connection request, it switches multiplexer 52 to deliver the 5-bit output of FIFO buffer 62 to shift register 56. State machine 50 then signals shift register 56 to convert the 5-bit value to serial form and to forward the data on line V0 to switch 12 of FIG. 2. Switch 12 routes the data to the appropriate output port.

As state machine 34 forwards packet data out of RAM 36 to FIFO buffer 62 it counts the nibbles sent and compares the count to the known length of the packet. After it forwards the last nibble of the packet through encoder 58 to FIFO buffer 62, state machine 34 switches multiplexer 60 to select and forward to FIFO buffer 62 a 5-bit hardwired "T" code. This code, which marks the end of the packet, passes through in FIFO buffer 62, multiplexer 52 and serializer 56 and travels out on line V0 at the end of the data packet.

When the last bit of nibble of a packet departs FIFO buffer 62, it signals state machine 50 that it is empty. State machine 50 then waits for another GRANTED signal pulse indicating that a next connection request has been established. It then signals state machine 34 with a NEXT_PACKET signal pulse indicating that it may send out another packet.

Note that whenever transmit state machine 50 is ready to send a connection request out on line V0, it simply halts any current flow of packet data outward on line V0, forwards the connection request out on V0, and then resumes the flow of packet data. Thus a connection request may appear in the middle of a data packet flowing from input port R0 to one of output ports T1–T23. The receiving output port recognizes and removes any connection requests from the data stream before forwarding them to the destination network station. Connection requests are thus forwarded to the input arbiter 54 while input port PB0 is still busy forwarding a data packet so that the input arbiter can immediately begin seeking the connection request as soon as possible after the packet currently being forwarded leaves the input port.

4B5B Encoding

Connection requests and data packets are transmitted on the same output line V0 primarily to reduce the number of inter-module links since the input port and input arbiter portions of input port R0 may be implemented on separate integrated circuits. The input arbiter 54 in any case monitors the V0 line to ascertain when a packet transmission ends. Connection requests and data packets are "4B5B" encoded to enable the input and output arbiters and the output port to determine when connection requests and data packets begin and end. Consistent with the ANSI standard X379(FDDI) "4B5B" encoding system, encoder 58 converts each incoming 4-bit nibble into a 5-bit output value as illustrated in Table II.

TABLE II

| NIBBLE | 4B5B |
|---|---|
| 0000 | 11110 |
| 0001 | 01001 |
| 0010 | 10100 |
| 0011 | 10101 |
| 0100 | 01010 |
| 0101 | 01011 |
| 0110 | 01110 |
| 0111 | 01111 |
| 1000 | 10010 |
| 1001 | 10011 |
| 1010 | 10110 |
| 1011 | 10111 |
| 1100 | 11010 |
| 1101 | 11011 |
| 1110 | 11100 |
| 1111 | 11101 |

Since only 16 of the 32 possible combinations of the five bits of a 4B5B code are needed to represent the sixteen possible values of a 4-bit nibble, the remaining 16 combinations of 4B5B code are available for other purposes. Table III below lists how the network switch of the present invention uses the remaining 16 4B5B codes.

TABLE III

| 4BSB | NAME | FUNCTION |
| --- | --- | --- |
| 00000 | Q | No Operation |
| 11111 | I | Idle |
| 00100 | H | No Operation |
| 11000 | J | Packet Start 1 |
| 10001 | K | Packet Start 2 |
| 01101 | T | End of Packet |
| 00111 | R | No Operation |
| 11001 | S | No Operation |
| 00001 | V | Violation |
| 00011 | V | Violation |
| 00010 | V | Violation |
| 00101 | V | Violation |
| 00110 | V | Violation |
| 01000 | V | Violation |
| 01100 | V | Violation |
| 10000 | CR | Con. Req. Start |

The CR code is used to identify the start of a connection request. The Q, H, R and S codes are ignored when they appear in a 4B5B encoded data stream. The T code indicates the end of a 4B5B encoded data packet. The I, J, K and V codes are used to synchronize transmission and receipt of 4B5B encoded data streams in the manner described below.

Output Port

FIG. 5 illustrates the output port T0 portion of I/O port R0/T0 of FIG. 2 in more detailed block diagram form. Output Ports T1–T23 are similar. Output port T0 includes a 10-bit serial-in, parallel-out shift register 70 clocked by the system clock signal CLK for receiving and storing data bits appearing on the H0 line. An output arbiter 71. A set of decoders 72 signal an input sequencer 74 when first five data bits stored in shift register 70 represent the I, V, T or CR 4B5B codes of Table II above or when all ten bits in shift register 70 represent the J and K codes in succession. A 4B5B decoder 76 converts the second stored 5-bit value into the corresponding 4-bit nibble and passes it via a multiplexer 78 to the input of a FIFO buffer 80.

When output port T0 is idle, output arbiter 71 arbitrates for a connection through switch 12 of FIG. 2 to an input port ready to send a data packet to port T0. Output arbiter 71, connected to horizontal line H0 of switch 12 of FIG. 2, determines when output port T0 is idle by looking for an end of packet code at the end of each incoming data transmission on line H0. The operation of output arbiter 71 is detailed below.

FIG. 6 is state diagram illustrating a synchronization process carried out by input sequencer 74 of FIG. 5. Input sequencer 74 begins in an "out-of-synchronization" state 81. Sequencer 74 remains in state 81 until decoder 72 detects the I (idle) signal. At that point synchronizer 74 moves to a "pre-synchronization" state 82. When decoder 72 signals detection of successive J and K symbols (indicating start of a data packet) synchronizer 74 switches to a "load pattern" state 83 wherein it switches multiplexer 78 to select the output of a pattern generator 79. Pattern generator 79 produces the network protocol PREAMBLE field for the data packet, which is the same for all data packets. As pattern generator 79 produces the PREAMBLE field, sequencer 70 shifts it into FIFO buffer 80. Thereafter, sequencer 74 switches multiplexer 78 to select the output of decoder 76, It then moves to state 84 of FIG. 6 wherein asserts an SI signal on every 5th pulse of the system clock signal. If decoder 72 detects the I code while sequencer 74 reverts to its pre-synchronization state 82. If decoder 72 detects the V code sequencer 74 reverts to out-of-synchronization state 106. If decoder 72 detects the CR code (indicating start of a connection request) while sequencer 74 is in state 84, the sequencer moves to a "connection request" state 85. State 85 is similar to state 84 except that in state 85 sequencer 74 does not shift the output of decoder 76 into FIFO buffer 80. Sequencer 74 remains in state 112 for the number of system clock cycles required for the connection request to pass through shift register 70. The sequencer 74 then reverts to state 84 to resume processing the data packet.

Referring again to FIG. 5, when FIFO buffer 80 signals it is not empty, a state machine 86 shifts data out of FIFO buffer 80 onto a 4-bit data input/output bus of a random access memory (RAM) 87. State machine 82 then supplies address and control signals to RAM 87 causing it to store the 4-bit nibble in RAM 86. State machine 86 uses RAM 87 as a large FIFO buffer for assembling and storing each data packet until it can be transmitted outward to the destination station. As each data packet arrives, state machine 86 checks its LENGTH field to determine the length of the packet. When the packet is fully assembled state machine 86 reads each successive nibble of the packet out of RAM 87 and shifts it into a FIFO buffer 88, bypassing the LENGTH field. State machine 86 monitors a FULL signal produced by FIFO buffer 88 and suspends loading data into buffer 88 when it is full. The longest stored nibble in FIFO buffer 88 is supplied to a 4-bit parallel-in/serial-out shift register 89. The serial output of shift register 89 passes to a conventional network interface circuit 90 which forwards each bit to the receiving network station via the TX0 bus. When it forwards a bit to the TX0 bus, interface circuit 90 signals an output state machine 91 and state machine 91 signals shift register 89 to shift out a bit. When a 4-bit nibble has been shifted out of register 89, state machine 91 checks an EMPTY signal produced by FIFO buffer 88. If FIFO buffer 88 is not empty, state machine 91 shifts a next nibble of the packet out of FIFO buffer 88 and shifts it into shift register 89.

Memory Controller

FIG. 7 illustrates memory controller 24 of FIG. 2 in more detailed block diagram form. Memory controller 24 includes a pair of decoders 92 and 93 and a set of tristate buffers 94. Decoders 92 and 93 receive the 5-bit physical port IDs from the winning input and output port via INPUT-PORT and OUTPUT-PORT lines of the GLOBAL bus. Decoder 92 produces 24 output bits B0–B23 supplied to RAM 14 of FIG. 2. Decoder 92 sets all bits B0–B23 to a logical "0" except one particular bit referenced by the PPORT_IN. Decoder 92 sets that bit to a logical "1". Decoder 93 also produces 24 output bits W0'–W23', setting all of them to a logical "0" except one particular bit referenced by PPORT_OUT. Decoder 93 sets that bit to a logical "1". Tristate buffers 94 connect the W0'–W23', signals to word lines W0–W23 of RAM 14 of FIG. 2. A pulse of the WE signal from arbitration sequencer 22 of FIG. 2 briefly enables tristate buffers 94 causing a pulse to appear on one of word line W0–W23 corresponding to the particular one of bits W0'–W23' set to a logical "1". RAM 14 of FIG. 2 responds to the pulse by storing the 24 data bits B0–B23 at a row corresponding to the pulsed word line. Since only one of bits B0–B23 is a logical "1", switch 12 of FIG. 2 makes only one connection to the output port corresponding to the row and breaks any other connections to that buffer.

Address Mapping

FIG. 8 illustrates the address translation system 26 of FIG. 2 and the address translation unit 44 of FIG. 4 in more detailed block diagram form. Address translation unit 44 includes a state machine 95, a comparator 96, an AND gate 97 and a bus interface circuit 98. Address translation system 26 includes a microcomputer 100 and a memory 102. Memory 102 stores the lookup table relating network addresses to logical port addresses. Bus interface circuit 98, microprocessor 100 and memory 102 are all linked to the MAPPING bus. When the destination (DEST), and source (SRC) network address fields of an incoming packet have been stored in registers 40 and 42 (FIG. 4), state machine 34 of FIG. 4 signals address translation unit 44 by pulsing a TRANS signal to indicate there is a pending address translation request.

Microprocessor 100 periodically polls the address translation unit 44 of each input port of the network switch to determine if it has a pending address translation request. To poll an address translation unit 44, microprocessor 100 broadcasts via the GLOBAL bus the physical port ID (PORT_ID) of the port to be polled. Comparator 96 compares the broadcast PORT_ID to physical port ID (PPORT) of the input port and asserts a signal at an input of AND gate 97 when PORT_ID matches PPORT. Microprocessor 100 then broadcasts a POLL signal via the MAPPING bus and bus interface circuit 98 to assert the second input of AND gate 97, thereby pulsing an input of state machine 95. If state machine 95 has a pending request it sends an acknowledge signal (ACK) back to microprocessor 100. After asserting the POLL signal (step 108), microprocessor 100 looks for an acknowledge (ACK) signal input from one of the translation units 44 indicating unit 44 has a pending translation request. If microprocessor 100 does not receive an ACK response it broadcasts a next value of PORT_ID to poll another port. However when microcomputer 100 receives an ACK response from a polled translation unit 44 having a pending translation, microcomputer 100 reads the SRC, DEST and VPORT fields from registers 40 and 42 of FIG. 4 via the MAPPING bus and bus interface circuit 98 and creates or updates a table entry in memory 102 relating the incoming logical port ID VPORT to the incoming network source address SRC. Microprocessor 100 also accesses the lookup table in memory 102 to determine the output logical port ID corresponding to the destination address (DEST), sends that VPORT data back to address translation unit 44, and then transmits a STEP signal back to state machine 95. On receipt of the STEP signal pulse, state machine 95 pulses the shift in (SI) input signal to FIFO buffer 45 of FIG. 4 which stores the port ID appearing on data bus 106 for subsequent use in a connection request. State machine 95 then pulses the ACK signal once again and thereafter awaits another TRANS pulse. After receiving the second ACK signal, microprocessor 100 polls the address translation unit of a next input port.

Switch Arbitration

Referring to FIG. 2, since more than one input port R0–R23 may concurrently request connections to the same output port T0–T23, an arbitration sequencer 22 is provided to arbitrate those competing demands. Output ports T0–T23 are interconnected to form an output token passing ring. An "output token" is a signal that is passed from output port to output port around the ring. The input ports R0–R23 are similarly interconnected to form an input token passing ring. Arbitration sequencer 22 starts an output token passing cycle by transmitting an "output seed" to all output ports T0–T23 via the GLOBAL bus. The output seed is the physical port ID of one the output ports. The "seed" output port having a physical port ID matching the output seed then determines whether it is idle or busy. An output port T0–T23 considers itself "busy" when it is currently receiving a data packet from an input port via switch 12 and considers itself "idle" when it not currently receiving a data packet from an input port. If the output seed port is idle it "wins" the right to seek a connection to an input port. The winning output port sends an "input seed" to all input ports R0–R23 via the GLOBAL bus, the input seed conveying a physical port ID identifying one of input ports R0–R23 as the seed input port. The winning output port also sends its own logical ID to all input ports and its own physical port ID to memory controller 24 via the GLOBAL bus.

When the seed input port receives the input seed it determines whether it is currently ready to send a data packet to the seed output port. If so, the seed input port, having "won" the arbitration, sends its physical ID via the GLO-BAL bus to all output ports T0–T23, to memory controller 24, and to sequencer 22. Sequencer 22 upon receiving the winning input port ID transmits a write enable (WE) signal to memory controller 12. Memory controller 12, having received the physical IDs of the winning input and output ports, responds to the WE signal by establishing a connection between the winning ports. Arbitration sequencer 22 then forwards the winning input port physical ID via a response line (RESP) to all input ports R0–R23 and to all output ports T0–T23. This ID tells the winning input port that it may begin transmitting the data packet through switch 12 to the winning output port and tells the winning output port that it may henceforth consider itself busy until it detects an end of packet (EOP) code at the end of the packet transmission.

If the seed input port is not ready to send a packet to a logical port matching that of the seed output port when it receives the input seed, the seed input port passes the input token to the next input port. If that input port has a packet to send to the output seed port, it wins the right to do so. Otherwise, if the input port receiving the input token is not ready to send a packet to the seed output port, the input token holder passes the input token to the next input port. The input token passing cycle continues until an input port receiving the token wants to make a connection to the output seed port or until the input token makes its way around the ring and returns to the seed input port. In that case, the seed input port transmits an end of cycle ("EOC") code to the seed output port telling it that no input port wants to send a packet to it. On receipt of the EOC code, or upon receipt of a valid input port ID indicating a connection has been made, the seed output port passes the output token to the next output port of the output token passing ring.

If the new output token holder is busy it immediately passes the output token to a next output port of the ring without starting an input token passing cycle. On the other hand, if the new output token holder is idle, it initiates a new input token passing cycle by sending its own logical ID to all input ports R0–R23 and by sending its own physical port ID to memory controller 24 and arbitration sequencer 22 via the GLOBAL bus. Input ports R0–R23 then pass the input token as described above until an input port wins the arbitration or until the input seed port sends an EOC code back to the output token holder. The process continues with each output port in turn receiving the output token and, if idle, starting an input token passing cycle in an attempt to find an input port with a packet destined for the output port. Whenever a winning input port is found, a connection is established between the winning input and output ports. When the output token eventually returns to the seed output port, the seed output port sends an EOC code to arbitration sequencer 22 via the GLOBAL bus indicating that the output token passing cycle has come to an end. The arbitration sequencer 22 thereafter starts a next output token passing cycle by sending another output seed to one of output ports T0–T23.

The seed output port has the highest priority for obtaining a connection during an output token passing cycle because it has the first chance to initiate an input token passing cycle. To ensure all output ports have equal opportunity to establish connections over the long term, arbitration sequencer 22 starts each successive output token passing cycle by choosing a next successive one of the output ports T0–T23 as the seed output port. Similarly, the input seed port has the highest priority for obtaining a connection to the current output token holder during an input token passing cycle, because the seed input port has the first opportunity to make the connection. Thus to ensure that all input ports are treated equally over the long term, each output port chooses a next successive one of the input ports R0–R23 as the seed input port each time the output port starts an input token passing cycle.

Output Arbiter

FIG. 9 illustrates in more detailed block and schematic diagram form the output arbiter 71 included in output port T0 of FIG. 5. Each output port T0–T23 includes a similar output arbiter. Output arbiter 71 carries out switch arbitration activities on behalf of output port T0. The GLOBAL bus of FIG. 2, interconnecting arbiters within all input and output ports to the arbitration sequencer 22 includes 24 lines conveying eight data values or control signals as illustrated in Table IV.

TABLE IV

| VALUE/SIGNAL | LINES | PURPOSE |
| --- | --- | --- |
| CLK | 1 | Global clock |
| INPUT_SEED | 5 | Input seed ID |
| OUTPUT_SEED | 5 | Output seed ID |
| INPUT_PORT | 5 | Input token holder ID |
| OUTPUT_PORT | 5 | Output token holder ID |
| REQUEST | 1 | Connection Request |
| SAMPLE_EVENTS | 1 | Starts token passing cycle |
| GRANTED | 1 | Indicates connection granted |
| VPORT | 5 | Logical Port ID |

Output arbiter 71 includes a state machine 127 clocked by the system clock (CLK) for controlling arbiter operation. Arbiter 71 also includes an end-of-packet (EOP) detection circuit 128 for detecting the end of a data packet appearing on horizontal line H0 of switch 12 (FIG. 2). The Q output of a flip-flop 129, supplied as an IDLE signal to state machine 127, indicates when the port is idle. Detection circuit 128 sets flip-flop 129 when it detects the end of a packet. State machine 127 resets the flip-flop whenever a connection to the port has been granted. Output arbiter 71 also includes a set of three tristate buffers 130–133, a set of comparators 134–136, a "seed generator" circuit 137, and a register 138. Comparators 134–136 provide data inputs to state machine 127. Comparator 134 asserts its output signal when data appearing on the INPUT_PORT lines of the GLOBAL bus matches an end-of-cycle (EOC) code. Comparator 135 asserts its output signal when the EOC code appears on the OUTPUT_PORT lines. Comparator 136 asserts its output signal when an output port ID appearing on the OUTPUT_SEED lines matches the port's physical ID (PPORT). Seed generator circuit 137 generates an next input port seed in response to a pulse of a NEXT signal from state machine 127. The external host controller writes the port's logical port ID into register 138 via the SYSTEM bus during system initialization. Tristate buffer 130 places the port's logical port ID VPORT on the VPORT lines of the GLOBAL bus and tristate buffer 132 places the port's physical port IC on the PPORT bus when enabled by a CONSUME signal generated by state machine 127. Tristate buffer 131 places the input seed produced by seed generator 137 on the INPUT_SEED lines of the GLOBAL bus when enabled by a SEED signal output of state machine 127. Tristate buffer 133 places an end of cycle (EOC) code on the OUTPUT_PORT lines when enabled by an END_CYCLE signal output of state machine 127.

FIG. 10 is a flow chart illustrating operation of state machine 127 of FIG. 9. Referring to FIGS. 9 and 10, on system power up, state machine 127 initializes itself (step 140). During step 140, state machine 127 de-asserts its OUTPUT_TOKEN signal supplied to the next output arbiter of the output token ring. State machine 127 also sets output signals END_CYCLE, CONSUME and SEED to turn off the three tristate buffers 130–133 and pulses a CLEAR output signal to reset flip-flop 128. State machine 127 then awaits a pulse on the SAMPLE_EVENTS line (step 142).

To start a token passing cycle, arbitration sequencer 22 (FIG. 2) places the PPORT ID of one of the output ports on the OUTPUT_SEED lines and then signals the start of the output token passing cycle by pulsing the SAMPLE_EVENTS line. On detecting the SAMPLE_EVENTS pulse, state machine 127 determines whether its output port is the output seed by looking at the output of comparator 135 (step 144). If output port T0 is not the output seed, then state machine 127 waits (step 146) until it has received the output token (i.e. until its input OUTPUT_TOKEN signal is asserted) and then moves to step 148. Otherwise if output port T0 is the output seed and has not received the output token (step 147), sate machine 127 moves directly to step 148.

At step 148 state machine 127 checks its IDLE input signal to determine whether its output port T0 is idle. If port T0 is not idle, state machine 127 passes the output token to the next output port (step 149) and returns to step 162. If port T0 is idle at step 148, state machine 127 pulses a NEXT signal input to seed generator 137 and sets its CONSUME and SEED output signals to turn on tristate buffers 130–132 (step 150), thereby placing the port's VPORT ID on the VPORT lines, placing the port's PPORT ID on the OUTPUT_PORT lines, and placing the input port seed on the INPUT_SEED lines. When a valid port ID appears on the INPUT_SEED lines, the input port arbiters arbitrate for connection to the output port whose VPORT ID appears on the VPORT lines. If an input arbiter having a pending connection request for output port T0 wins the arbitration, it places its PPORT ID on the INPUT_PORT lines and asserts the REQUEST signal line. If no input arbiter has a pending request for output port T0, the seed input port places an EOC (end-of-cycle) code on the INPUT_PORT lines.

After initiating an input token passing cycle at step 150, state machine 127 cycles through steps 152 and 154 looking for either an EOC code on the INPUT_PORT lines (step 152) or assertion of the REQUEST signal (step 154). If the REQUEST signal is asserted, there is a pending request for port T0 that is about to be granted. Accordingly state machine 127 resets flip-flop 129 (step 156) to indicate port T0 is no longer idle and then waits for assertion of the GRANTED signal (step 158). Central arbitration sequencer 22 of FIG. 2 asserts the GRANTED signal when it has established the connection between input and output ports identified by the PPORT codes on the INPUT_PORT and OUTPUT_PORT lines. After the connection has been granted, state machine 127 passes the output token to the next output port (step 160).

After passing the output token at steps 149 or 160, state machine 127 again checks whether port T0 is the output seed (step 162) by looking at the output of comparator 136. If not, state machine 127 waits until the output of comparator 135 indicates that an EOC code appears on the OUTPUT_PORT lines (step 164). The output seed port places the EOC code on the OUTPUT_PORT lines to mark the end of the output token passing cycle. At that point state machine 127 re-initializes the output arbitrator (step 140) and then waits (step 142) for a SAMPLE_EVENTS pulse signaling the start of another output token passing cycle.

If state machine 127 determines at either step 144 or step 162 that port T0 is the output seed, it reverts to step 147 where it checks whether it has the output token (step 147). If the output seed has received the token, the output token passing cycle has ended, all output arbiters having received and passed the output token. Thus state machine 127 sets its END_CYCLE output signal (FIG. 9) to turn on tristate buffer 130 to put the EOC code on the OUTPUT_PORT lines (step 166) to signal the end of the output token passing cycle. State machine 127 then waits (step 168) until the central arbiter 22 (FIG. 2) responds to the EOC code by pulsing the GRANTED signal. State machine 127 then returns to step 140, re-initializes the output arbiter and thereafter awaits the start of another output token passing cycle (step 142).

Input Arbiter

FIG. 11 illustrates the input arbiter 54 of input port R0 seen in FIG. 4. The other input ports R1–R23 have similar input arbiters. Arbiter 54 includes a state machine 170 for sequencing arbiter operations. A request detection circuit 172 detects a connection request arriving via crosspoint switch vertical line V0 from shift register 56 of FIG. 4 and delivers the destination address included in the request to a register 174, input enabled by the SAMPLE_EVENTS signal. When the connection request is granted, state machine 170 pulses a CLEAR signal to clear the PORT_ID data stored in interface 172. Input arbiter 54 also includes two tristate buffers 176 and 178 and a set of three comparators 180–182. Buffer 176 places the input port's physical port ID PPORT on the INPUT_PORT lines of the GLOBAL bus in response to a CONSUME signal generated by state machine 170. Buffer 178 places an end of cycle (EOC) code on the INPUT_PORT lines in response to an END_CYCLE signal generated by state machine 170. Comparator 180 provides an indicating signal to state machine 170 when the EOC code appears on the INPUT_PORT lines. Comparator 181 signals machine 170 when the input port's physical port ID (PPORT) appears on the INPUT_SEED lines. Comparator 182 notifies machine 170 when register 174 stores the same VPORT ID that is conveyed on the VPORT lines of the GLOBAL bus.

FIG. 12 is a flow chart illustrating operation of state machine 170 of FIG. 11. Referring to FIGS. 11 and 12, following system power up, state machine 170 initializes by setting its CONSUME output signal to turn off buffer 176 and by pulsing the CLEAR signal to initialize the PORT_ID data in request detector 172 (step 182). Thereafter state machine 170 waits (step 184) until it detects a pulse on the SAMPLE_EVENTS line, indicating the start of a token passing cycle. State machine 170 then checks the output of comparator 181 to determine if the physical port ID (PPORT) of port R0 is conveyed on the INPUT_SEED lines, thereby indicating that port R0 is to be the input seed (step 186). If port R0 is the input seed and does not have the token (step 188) or if input port R0 is not the input seed but does have the token (step 190), state machine 170 checks the output of comparator 182 to determine if there is a pending request for an output port having a logical port ID (VPORT) appearing on the VPORT lines (step 192). If input port R0 does not have a pending request for the output port, state machine 170 passes the input token (step 194) by asserting its output INPUT_TOKEN signal. It then waits for a pulse of the GRANTED signal or appearance of an EOC code on the INPUT_PORT lines (step 196) indicating the end of either an output or input token passing cycle. Thereafter, state machine 170 re-initializes (step 182) and waits for the start of another input token passing cycle (step 184).

If at step 190 state machine 170 has not received the input token, it cycles through steps 190 and 191 until it receives the input token (step 190) or until it detects from the output of comparator 180 that a request has been granted (step 191). If a request is granted to another input port before state machine 170 receives the input token, state machine 170 re-initializes (step 182) and waits for the start of another input token passing cycle (step 184).

If at step 192 state machine 170 determines from the output of comparator 174 that it has a pending request for the output port whose ID appears on the OUTPUT_PORT lines, then at step 198 state machine 170 sets its CONSUME signal output to turn on buffer 176 thereby placing the PPORT ID of input port R0 on the INPUT_PORT lines. At step 198 state machine 170 also signals via the REQUEST line of the GLOBAL bus that it is requesting a connection and pulses its CLEAR output to clear the connection request in interface circuit 172. The state machine 170 then waits for a pulse of the GRANTED signal or appearance of an EOC code on the INPUT_PORT lines (step 196) indicating the end of either an output or input token passing cycle. Thereafter, state machine 170 re-initializes (step 182) and waits for the start of another input token passing cycle (step 184).

If state machine 170 determines at step 186 that its input port is the input seed and determines at step 188 that it has the input token, then state machine 170 sets its END_CYCLE output signal so that buffer 179 places the EOC code on the INPUT_PORT line (step 200) to signal the end of the input token passing cycle. It then waits (step 202) for sequencer 22 of FIG. 2 to acknowledge the end of the input token passing cycle by pulsing the GRANTED signal. Thereafter state machine 170 re-initializes (step 182) and waits for the start of another input token passing cycle (step 184).

Arbitration Sequencer

FIG. 13 illustrates arbitration sequencer 22 of FIG. 2 in more detailed block diagram form. Sequencer 22 includes a state machine 210 for sequencing device operations. An output seed generator 212 places the PPORT ID of one of the output ports on the OUTPUT_SEED lines of the global bus. A pulse of a NEXT signal produced by state machine 210 tells seed generator 212 to select a next one of the output port IDs. A comparator 214 signals state machine 210 when the OUTPUT_PORT lines convey the EOC (end-of-cycle) code. State machine 210 also supplies the write enable signal WE for memory controller 24 of FIG. 2. When state machine 210 asserts a RESPOND signal, a tristate buffer 220 delivers the input port physical port ID PPORT conveyed on the INPUT_PORT lines as the connection request response (RESP) to all input port of the global bus. This tells the indicated input port that its last connection request has been granted.

FIG. 14 is a flow chart illustrating operation of state machine 210 of FIG. 13. Referring to FIGS. 13 and 14, state machine 210 initializes following power up by setting the RESPOND signal to turn off buffer 220, and driving its GRANTED and SAMPLE_EVENTS signals low. (step 230). State machine 210 then pulses the NEXT signal causing seed generator 212 to place an output port PPORT ID on the OUTPUT_SEED lines (step 234). State machine 210 next pulses the SAMPLE_EVENTS line to signal the start of an output token passing cycle (step 236). It then continues to repeat steps 238 and 240 until at step 238 it detects a pulse on the REQUEST line or at step 240 it detects a comparator 214 output signal indicating EOC code is appearing the OUTPUT_PORT line. An input arbiter pulses the REQUEST line to request a connection between input and output ports identified by the PPORT codes on the INPUT_PORT and OUTPUT_PORT lines. On detection of the REQUEST line pulse at step 238, state machine 210 transmits a write enable signal WE to memory controller 24 of FIG. 2 (step 242). The memory controller responds by storing data in RAM 14 of FIG. 2 establishing the connection between the winning input and output ports. State machine 210 then pulses the GRANTED line (step 244) to tell the input and output ports that the request is granted and pulses the RESPONSE signal to turn on buffer 220 to send the input port PPORT ID onto the RESP line. Thereafter state machine 210 returns to steps 238/240. If, at step 240, comparator 214 signals state machine 210 that it has detected the end of an output token passing cycle, state machine 210 re-initializes (step 230) and begins a next output token passing cycle.

Thus has been shown and described a network switch for routing data packets between network stations, each data packet including a network address of the destination station to receive the packet. When the destination station can be accessed through any of several output ports of the network switch, the switch automatically routes the packet from the switch input port that received it to any one of those output ports that is ready to forward the packet. Thus a busy output port accessing a packet's destination station will not block packet transmission when the packet can be routed to the destination station through another output port accessing the same destination station.

While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A network switch for routing data transmission between network stations, each data transmission including a network address of a destination station to receive the data transmission, the network switch comprising:
    an address translation system; and
    a plurality of input/output (I/O) ports,
        wherein each I/O port communicates with a subset of said network stations including receiving data transmissions from and forwarding data transmissions to network stations of said subset,
        wherein each I/O port is identified by a logical port ID referencing the subset of network stations with which it communicates, with more than one of said of I/O ports communicating with a similar subset of network stations and being identified by a similar logical port ID,
        wherein each I/O port upon receiving a data transmission from a network station sends a network address included in the data transmission to said address translation system, and
        wherein said address translation system generates in response to the sent network address a logical port ID identifying a set of I/O ports that communicate with a network station identified by the sent network address.

2. The network switch in accordance with claim 1 further comprising means for establishing a path for a data transmission from any one of said I/O ports receiving a data transmission from a network station to any one of a set of I/O ports having a logical port ID generated as output by said address translation system in response to a network address sent to said address translation system by the I/O port receiving the data transmission.

3. The network switch in accordance with claim 2 wherein each I/O port is also identified by a unique physical port ID, and wherein said means for establishing a path comprises:
    routing means for selectively establishing said path in response to input routing control data including physical port IDs of the I/O port receiving the data transmission and said any one of said set of I/O ports; and
    arbitration means for ascertaining a physical port ID of the I/O port receiving the data transmission, for ascertaining a physical port ID of the I/O port having a logical port ID generated as output by said address translation system in response to a network address sent by the I/O port receiving the data transmission, and for transmitting routing control data including the physical port IDs of the I/O port receiving the data transmission and the I/O port having said logical ID to said routing means.

4. The network switch in accordance with claim 3 wherein said routing means comprises a crosspoint switch.

5. The network switch in accordance with claim 3 wherein said arbitration means polls said I/O ports to ascertain a physical port ID and a logical port ID of an I/O port which is not currently busy forwarding a transmission to one of said network stations.

6. The network switch in accordance with claim 5 wherein said arbitration means polls the I/O ports to ascertain a physical port ID of an I/O port having sent an address to said translation system in response to which said address translation system has generated a logical port ID matching the logical port IC of the I/O port not currently busy forwarding a transmission to one of said network stations.

7. For a network including a plurality of network stations, each network station having a unique network address, a network switch for selectively routing data transmissions between said network stations, wherein each data transmission includes network addresses of the data transmission's source and destination network stations, the network switch comprising:
    a plurality of input/output (I/O) ports,
        wherein each I/O port communicating with at least one of said network stations by receiving data transmissions therefrom and transmitting data transmissions thereto, each I/O port being identified by a unique physical port ID and by a logical port ID corresponding to a set of network stations with which the I/O port communicates,
        wherein more than one of said I/O ports communicate with a similar set of network stations and share a similar logical port ID,
        wherein each I/O port receiving a data transmission from one of said network stations generates an address translation request containing its own logical port ID containing the source and destination network addresses included in the data transmission; and
    address translation means for receiving translation requests from said I/O ports, for ascertaining from logical port IDs and source network addresses included in said translation requests a relationship between each network station's network address and a logical port ID identifying all I/O ports that communicate with that station, and for returning to each I/O port sending an address translation request, a logical port ID identifying all I/O ports which communicate with a destination network station identified by a network address included in the translation request.

8. The network switch in accordance with claim 7 further comprising routing means for selectively interconnecting any one of said I/O ports to any other of said I/O ports for routing data transmissions therebetween in accordance with input routing control data including physical port IDs of the I/O ports to be interconnected.

9. The network switch in accordance with claim 8 further comprising arbitration means for communicating with said I/O ports to determine for each data transmission received by an I/O port from a network station, a first physical port ID of the I/O port that received the data transmission, a logical port ID returned to that I/O port from the address translation system, a second physical port ID of an I/O port identified by the returned logical port ID that is not currently sending a data transmission to a network station, and for thereafter transmitting routing control data to said routing means, the routing control data including the first and second physical port IDs.

10. For network including a plurality of network stations, each network station having a unique network address, a network switch for selectively routing data transmissions between said network stations, wherein each data transmission includes network addresses of the data transmission's source and destination network stations, the network switch comprising:

a plurality of input/output (I/O) ports;

address translation means;

routing means; and arbitration means, wherein each I/O port communicates with at least one of said network stations by receiving data transmissions therefrom and transmitting data transmissions thereto, wherein each I/O port is identified by a unique physical port ID and by a logical port ID corresponding to a set of network stations with which the I/O port communicates, wherein more than one of said I/O ports communicates with a similar set of network stations and share a similar logical port ID, wherein when any of said I/O ports receives a data transmission, it stores the data transmission, generates an output translation request including the source and destination station network addresses included in the data transmission and including its own logical port ID, wherein when any of said I/O ports receives an input translation response containing a logical port ID of I/O ports it stores that logical port I/D, wherein when any of said I/O ports storing a data transmission received from a source station and storing a logical port ID received in a translation response receives input poll data including its own physical ID and a stored logical port ID returned from said address translation system, that I/O port generates an input poll response including its stored logical port ID, wherein when any of said I/O ports not currently forwarding a data transmission to a station receives output poll data including its own logical port ID, it generates an output poll response including its own physical port ID;

wherein when any of said I/O ports storing a data transmission received from a source station receives a connection grant including its own physical port ID, it provides its stored data transmission as output, wherein said address translation means receives translation requests from said I/O ports, identifies from logical port ID's and source station network addresses included in said translation requests a relationship between each station's network address and a logical port ID identifying all I/O ports that communicate with that station, and returns to the I/O port sending each translation request a translation response containing a logical port ID of I/O ports which communicate with a destination station identified by a network address included in the translation request, wherein said routing means selectively interconnects any one of said I/O ports to any other of said I/O ports for routing data transmissions therebetween in accordance with input routing control data, wherein said arbitration means generates and transmits input and output poll data to said I/O ports and receives input and output poll responses from said I/O ports thereby to determine which I/O ports are storing data transmissions received from network stations and to determine physical port ID's of output ports that are ready to forward the data transmissions to their destination network stations, wherein said arbitration means generates and transmits routing control data to said routing system, such that said routing system connects each I/O port storing a data transmission received from a source station to an I/O port that may forward the data transmission to its destination station, and wherein said arbitration means generates and transmits grants to the I/O ports storing received data transmissions such that said I/O ports output said stored data transmissions and send them via said routing means to I/O ports that are ready to forward them to destination network stations.

* * * * *